2,710,857

SYNTHESES OF PEPTIDES AND SUBSTITUTED AMIDES

James R. Vaughan, Jr., Darien, Conn., assignor to American Cyanamid Company, New York, N. Y., a corporation of Maine No Drawing. Application May 17, 1951,
Serial No. 226,938

14 Claims. (Cl. 260—112)

This invention relates to a new method of organic synthesis and more particularly to a new method of preparing substituted amides and peptides.

Substituted amides and even peptides can be prepared by many known methods. However, the increasing interest in peptide chemistry and more particularly in the study of viruses and enzymes and their decomposition products has shown the need for more efficient syntheses of amides and peptides than those now available. Most of the viruses and enzymes which are of great interest in chemistry and medicine are believed to be proteins or protein like materials and in the study of such proteins it is customary to partially hydrolyze the same to obtain partial decomposition products which can be identified. An excellent method of identification comprises synthesizing a compound having the formula which the decomposition product is believed to have and comparing the synthetic compound with the unknown compound derived from a natural source. In the case of proteins, the partial decomposition products are, for the most part, amides or peptides formed from optically active aminoacids. These intermediate decomposition products are often very sensitive compounds and are subject to further decomposition by heat or other harsh conditions.

In any attempted synthesis of amides and peptides of the above type it is often necessary that methods be employed which do not require even moderately high temperatures and in which other reaction conditions are extremely mild. Attempted synthesis of such compounds by methods of the prior art many times result in undue racemization of the aminoacid reactants and decomposition of the reaction products. Such phenomena inevitably leads to a complex mixture from which it is extremely difficult to isolate the desired reaction product even if it is formed.

A method of preparing amides and peptides which is adaptable with modification to low temperatures has recently been reported by which amides were formed by reacting an amine with a mixed anhydride formed from the desired acid and benzoylchloride (Ann., 569, page 128). While such a method is a commendable advance in the art, it has now been found that improved results can be obtained by reacting an amine having amine hydrogen with a mixed anhydride of an alpha or beta branched chain, saturated fatty acid having from four to seven carbon atoms inclusive and an acid derived from an aminoacid by blocking the amino group or groups by acylation. This improved rapid, low temperature method constitutes the subject matter of the present invention.

The new method of this invention may be more clearly illustrated by the following equation:

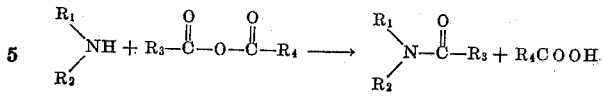

in which $R_1$ represents an organic radical capable of being attached to an amine group by a carbon to nitrogen linkage, $R_2$ represents hydrogen or an organic radical capable of being attached to an amine group by a carbon to nitrogen linkage,

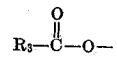

represents an organic radical derived from an aminoacid, and $R_4$ represents a branched chain hydrocarbon radical selected from the group consisting of those having side chains attached on the alpha or beta carbon atom and having from three to six carbon atoms inclusive.

As stated above, the radical represented by

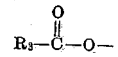

is a group derived from an aminoacid. More specifically $R_3$ represents an organic radical attached to the carbonyl group by a carbon to carbon linkage and having an acidamido substituent, preferably in the alpha or beta position. For instance, when the group

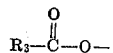

is derived from an alpha aminoacid, the mixed anhydride may be represented by the following formula:

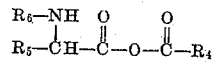

in which $R_4$ is as defined above, $R_5$ is hydrogen or an organic radical attached by a carbon to carbon linkage and $R_6$ is an acyl group. In many instances the acyl group may also conveniently be derived from an aminoacid or a peptide in which case the process of this invention will result in the formation of a higher peptide derivative.

While the mixed anhydrides employed in the process of this invention may be prepared by almost any of the known methods for preparing mixed anhydrides, the preferred method comprises reacting an acid chloride of an aliphatic branched chain acid with an acid formed from an aminoacid by acylating the amino group. This reaction may be illustrated by the following equation:

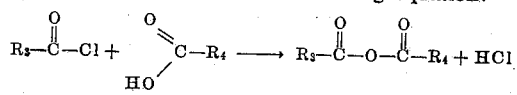

in which $R_3$ and $R_4$ are as defined above.

Practically any primary or secondary amine having amine hydrogen is suitable for use in the new reaction of this invention and the particular amine employed depends upon the substituted amide desired. Amines which may suitably be employed in the new process may be illustrated by the following: primary aliphatic amines, for instance methylamine, ethylamine, propylamine, butylamine, hexylamine and allylamine; secondary aliphatic amines, for instances dimethylamine and dibutylamine; substituted aliphatic amines, for instance chloroethylamine, phenethylamine and benzylamine; aromatic amines, for instance aniline and naphthylamine; substituted aromatic amines, for instance m-toluidine and p-benzylaniline; secondary mixed aliphatic-aromatic amines, for instance N-allylaniline, and benzylaniline; cyclic amines, for instance piperidine, and morpholine; heterocyclic amines, for instance aminopyrimidine; diamines, for instance butylenediamine, and ethylenediamine.

Many other amines are equally suitable for use in the new method of this invention, the main requirement being that the compound have a free amino group having amine hydrogen. In many compounds which might ordinarily be considered to have a free amino group, this group is in reality neutralized by salt formation. This is the case with aminoacids. Therefore, if an aminoacid is to furnish the amino group for the above reaction, it should be employed in a basic solution so that a free amino group is actually available. It should also be mentioned that secondary amines which are substituted with two highly negative aromatic groups, for instance diphenylamine, usually cause difficulty in any method of preparing amides from amines and likewise may not be satisfactorily employed in the new process of this invention. Such amines may be characterized by their low dissociation constant as they have in water at 25° C. a dissociation constant of less than $1 \times 10^{-13}$.

Basic salts of aminoacids, as well as aminoacid esters and amides may advantageously be employed in the new process of this invention for the preparation of peptides and polypeptides. In fact, it is in the preparation of peptides and polypeptides that the new process has its greatest utility. Aminoacids, the basic salts, esters and amides of which can be employed, may be illustrated by the following: alanine, valine, norvaline, leucine, norleucine, isoleucine, isovaline, phenylalanine, tyrosine, serine, cysteine, methionine, aspartic acid, glutamic acid, lysine, ornithine, asparagine, histidine, tryptophane, proline and hydroxyproline. Many of the above aminoacids have sensitive groups and in addition often exist in optically active forms. These qualities made them unsuitable for satisfactory use in many of the prior art methods of preparing amides.

From the above discussion it will be seen that there are several procedures within the scope of this invention by means of which it is possible to prepare long chain polypeptides. The polypeptides may be built one molecule at a time by reacting a basic salt of an aminoacid with the mixed anhydride, forming a mixed anhydride of the reaction product and reacting this with more aminoacid salt and so on. Polypeptides may also be built several molecules at a time by preparing a mixed anhydride of a peptide derivative and reacting this with a free amino group of another peptide. By either procedure, excellent results are obtained.

Employing a mixed anhydride of a branched chain aliphatic acid offers several unexpected advantages over the use of the corresponding mixed anhydrides of aromatic acids and also over the corresponding mixed anhydrides of straight chain aliphatic acids. Examples of such advantages are higher initial purity of the reaction product, better adaptability to very low temperature conditions, and perhaps the most important, an increased yield of reaction product. Another advantage of the new process is that the desired reaction product is more readily separated from the reaction mixture in pure form. These advantages become increasingly important in the synthesis of very high molecular weight polypeptides.

The following table lists the results of comparative tests in which mixed anhydrides of aromatic, straight chain aliphatic and branched chain aliphatic acids with carbobenzoxyglycine were reacted with aniline in the synthesis of carbobenzoxyglycine anilide. In all tests, the reaction temperatures and other reaction conditions were substantially the same, a toluene solvent and a temperature of 0° to 10° C. being employed in every case.

TABLE I

| Mixed anhydride of carbobenzoxyglycine with— | Yield of carbobenzoxyglycine anilide in percent of theoretical yield | Melting point in degrees Centigrade |
|---|---|---|
| Trimethylacetic acid | 72 | 144–145 |
| Dimethylacetic acid | 64.5 | ¹ 146–147 |
| Diethylacetic acid | 85 | 145–147 |
| Isovaleric acid | 83 | 146–147 |
| Isocaproic acid | 36 | ¹ 143–145 |
| Heptanoic acid | 31 | 139–141 |
| Lauric acid | 49 | 143–144 |
| Acetic acid | 36 | ¹ 144–145 |
| Trichloroacetic acid | 48 | 143–144 |
| Phenylacetic acid | 40 | 142–144 |
| Benzoic acid | 62 | ¹ 141–142 |
| Hexahydrobenzoic acid | 37 | ¹ 146–147 |
| 2 methoxybenzoic acid | 18 | ¹ 143–144 |
| 2 methylbenzoic acid | 38 | ¹ 140–142 |
| 2,4-dichlorobenzoic acid | 49 | ¹ very crude |

¹ After recrystallization from methanol.

The above table illustrates a number of points. First, the table shows that a purer product is obtained by the use of a mixed anhydride of an alpha or beta branched chain acid than can be obtained by the use of mixed anhydrides of either straight chain aliphatic or aromatic acids. In fact, the carbobenzoxyglycine anilide obtained by the use of a mixed anhydride of an alpha or beta branched chain acid was so pure that it had almost the melting point of chemically pure material while the carbobenzoxyglycine prepared with other types of mixed anhydrides had to be recrystallized from methanol before it had a comparable melting point. Second, the table shows that a considerably better yield can be obtained by the use of mixed anhydrides of alpha or beta branched chain acids than can be obtained by the use of mixed anhydrides of either straight chain aliphatic or aromatic acids. A point of interest in this connection is that the yields obtained by the use of a mixed anhydride of benzoic acid are not increased by employing higher temperatures. Similar tests were performed with a mixed anhydride of benzoic acid and glycine at room temperature and at 100° C. and the yields of carbobenzoxyglycine anilide were respectively 45% and 36% of theoretical. Third, the table illustrates the point that the use of mixed anhydrides of aliphatic acids having the alpha or beta carbon atom substituted with negative groups rather than positive hydrocarbon groups does not give the same highly satisfactory results. Fourth, the table shows that not even by the substitution of the aromatic nucleus with either positive or negative groups can mixed anhydrides of aromatic acids give results comparable to those obtained from mixed anhydrides of branched chain aliphatic acids. And fifth, the table shows that the branching of the chain must be at the alpha or beta carbon atom in the mixed anhydride of the branched chain aliphatic acid in order for satisfactory results to be obtained.

The reasons for the surprising superiority of the new process are not fully understood but the excellent results are believed to be due to a number of factors. One such factor is steric hindrance. It is believed that the branching of the aliphatic chain inhibits the reaction of this part of the anhydride molecule with the amino group and thus forces the reaction to follow the desired course. Another factor which is believed to contribute to the success of the new process is the arrangement of positive groups in the anhydride molecule. The branching of the aliphatic chain is believed to place a number of positive groups very near the carbonyl group derived from the branched chain aliphatic acid thus resulting in a greater electron density in the vicinity of this carbonyl group. This would also tend to deter the reaction with amino groups of the branched chain part of the anhydride molecule and thus force the reaction to proceed favorably. But it is not desired that this invention be limited by theory and it is intended that the invention cover the new process regardless of the reasons for its unusual success.

It is one of the advantages of the new process that it may be carried out advantageously at low temperatures. In fact, while the reaction may be carried out at temperatures up to about 80° C. if desired, the process gives increasingly better yields as the temperature is decreased. It is in some instances advantageous to perform the reaction at temperatures as low as about minus 20° C. However, since under most circumstances higher temperatures are quite satisfactory, temperature of from about minus 5° C. to plus 15° C. are preferred for reasons of convenience. The reaction is substantially complete in only a short time, for instance 1 to 2 hours even at extremely low temperature; however, as a prolonged reaction period is not detrimental, a longer time, for instance 6 to 12 hours is usually allowed. In fact, reaction mixtures have been allowed to remain undisturbed for as long as three days with excellent results.

The new reaction of this invention may be advantageously performed in an inert solvent and preferably in an aromatic hydrocarbon solvent such as toluene or xylene. In most instances the mixed anhydride will also be prepared in an inert solvent and in such cases the anhydride need not be isolated for the solvent used in preparing the anhydride can also serve as the solvent for the process of this invention. In addition to the aromatic hydrocarbons, there are many other suitable inert solvents as may be illustrated by the following: chlorinated hydrocarbons, for instance chloroform, carbon tetrachloride and chlorobenzene; aliphatic ethers, for instance ethyl ether; cyclic ethers, for instance dioxane; aliphatic ketones, for instance dibutyl ketone and aliphatic esters, for instance ethyl acetate. When the mixed anhydride is to be reacted with a basic salt of an aminoacid, it is sometimes advantageous to add an organic solution of the anhydride to an aqueous solution of the aminoacid salt.

The new process will be more fully illustrated by means of the following specific examples in which all parts are by weight unless otherwise indicated.

Example I

A solution of 5.23 parts by weight of carbobenzoxyglycine and 2.55 parts by weight of triethylamine in 50 parts by volume of toluene is cooled to 0° C. and 3.01 parts by weight of isovaleryl chloride is added. The mixture is retained at this temperature for a period of about 2 hours to allow the mixed anhydride of isovaleric acid and carbobenzoxyglycine to be formed.

To the solution of the mixed anhydride there is added 2.34 parts by weight of aniline. The reaction mixture is then retained at a temperature of about 8° C. for a period of several hours to obtain crystallization of the resulting carbobenzoxyglycine anilide. The resulting crystals of carbobenzoxyglycine aniline are washed with water, dilute sodium hydroxide and dilute hydrochloric acid to remove triethylamine hydrochloride and other impurities and then dried at low temperature.

It will be noticed that at no time during the above procedure was the temperature allowed to go above about 10° C., and yet yields are generally about 80–85% of theoretical of a material having a melting point of about 145°–147° C.

In place of the isovaleryl chloride in the above example, one can substitute equal molar quantities of other alpha or beta branched chain acid chlorides such as isobutyryl chloride, pivalyl chloride, 2-ethylbutyryl chloride and 2-methylbutyryl chloride so that the mixed anhydrides of isobutyric acid, pivalic acid, 2-ethylbutyric acid and 2-methylbutyric acid respectively are formed and reacted with aniline to produce carbobenzoxyglycine anilide. Some of the results obtained when such substitutions were made are given in Table I.

Example II

A solution of 5.23 parts by weight of carbobenzoxyglycine and 2.55 parts by weight of triethylamine in 50 parts by volume of toluene is cooled to minus 5° C. and 3.01 parts by weight of isovaleryl chloride added. The solution is maintained at this temperature for about one hour to allow for the formation of the mixed anhydride of isovaleric acid and carbobenzoxyglycine. To the solution of the mixed anhydride there is added 4.80 parts by weight of ethyl DL-phenylalanate and the mixture retained overnight at about 8° C. The mixture is washed with water and the precipitate of ethyl carbobenzoxyglycyl-DL-phenylalanate removed by filtration and washed with 3% sodium bicarbonate solution to remove triethylamine hydrochloride. The toluene layer is separated from the filtrate and washed with 3% sodium bicarbonate solution. The resulting organic layer is rapidly separated and diluted with petroleum ether until cloudy. Upon cooling a second crop of carbobenzoxyglycyl-DL-phenylalanate is crystallized from the solution. The two crops of crystals are combined and purified by recrystallization from alcohol-water.

Example III

Example II is repeated but employing 3.37 parts by weight of diethylacetyl chloride in place of the isovaleryl chloride of that example. Carbobenzoxyglycyl-DL-phenylalanate is obtained as colorless crystals in substantially equal yield.

Example IV

Example II is repeated but employing 3.01 parts by weight of trimethylacetyl chloride in place of the isovaleryl chloride of that example. Again carbobenzoxyglycyl-DL-phenylalanate is obtained in substantially equal yield.

Example V

A solution of 4.18 parts by weight of carbobenzoxyglycine and 2.04 parts by weight of triethylamine in 50 parts by volume of toluene is cooled to minus 5° C. and 2.41 parts by weight of isovaleryl chloride added. The solution is retained at this temperature for about one hour to allow for formation of the mixed anhydride and to the solution of the mixed anhydride there is added 4.18 parts by weight of ethyl L-tyrosinate dissolved in 50 parts by volume of chloroform. This mixture is retained overnight at about 8° C. and then washed with water followed by 3% sodium bicarbonate solution. After one-half hour the crystalline ethyl carbobenzoxyglycyl-L-tyrosinate is removed by filtration and purified by recrystallization from alcohol-water.

Example VI

A solution of 5.30 parts by weight of carbobenzoxy-L-leucine and 2.04 parts by weight of triethylamine in 25 parts by volume of toluene plus 25 parts by volume of chloroform is cooled to minus 5° C. and 2.41 parts by weight of isovaleryl chloride added. The solution is maintained at this temperature for one and one-half hours to allow for the formation of the mixed anhydride. To the solution of the mixed anhydride there is added a second solution precooled to 0° C. and prepared from 2.79 parts by weight of ethyl glycinate hydrochloride, 2.04 parts by weight of triethylamine and 50 parts by volume of chloroform. The reaction mixture is then allowed to stand overnight at a temperature of about 8° C. The mixture is then washed with water to remove triethylamine hydrochloride and the organic phase separated, washed with 3% sodium bicarbonate solution and then diluted with petroleum ether until cloudy. On cooling, colorless crystals of ethyl carbobenzoxy-L-leucyl-glycinate separate and are removed by filtration. Concentration of the mother liquor almost to dryness in a stream of air followed by dilution with petroleum ether gives a second crop of ethyl carbobenzoxy-L-leucyl-glycinate. The two crops of crystals are combined and purified by recrystallization from alcohol-water.

*Example VII*

A solution of the mixed anhydride of dicarbobenzoxy-L-lysine and isovaleric acid is prepared by the procedure of Example VI but employing 8.29 parts by weight of dicarbobenzoxy-L-lysine in place of the carbobenzoxy-L-leucine of that example. To the solution of the mixed anhydride there is added a second solution precooled to 0° C. and prepared from 2.79 parts by weight of ethyl glycinate hydrochloride, 2.04 parts by weight of triethylamine and 50 parts by volume of chloroform and the reaction mixture allowed to stand overnight at a temperature of about 8° C. The reaction mixture is then washed with water and the crystalline precipitate of ethyl dicarbobenzoxy-L-lysylglycinate removed by filtration and washed with 3% sodium bicarbonate solution. The organic layer is separated from the filtrate, washed with 3% sodium bicarbonate solution and diluted with petroleum ether to crystallize a second crop of ethyl dicarbobenzoxy-L-lysylglycinate. The two crops are combined and purified by recrystallization from ethyl acetate-petroleum ether.

*Example VIII*

A solution of the mixed anhydride of carbobenzoxy-L-leucine and isovaleric acid was prepared by the procedure of Example VI. To the solution of the mixed anhydride there is added a solution precooled to 0° C. and prepared from 3.62 parts by weight of methyl L-leucinate hydrochloride, 2.04 parts by weight of triethylamine and 50 parts by volume of chloroform and the resulting reaction mixture allowed to stand overnight at a temperature of about 8° C. The reaction mixture is then washed with water and 3% sodium bicarbonate solution. The washed solution is then concentrated almost to dryness in an air stream and diluted with petroleum ether until cloudy. The methyl carbobenzoxy-L-leucyl-L-leucinate slowly crystallizes and is removed by filtration. The product is purified by recrystallization from alcohol-water followed by crystallization from ethyl acetate-petroleum ether.

*Example IX*

A solution of 4.46 parts by weight of carbobenzoxy-DL-alanine and 2.04 parts by weight of triethylamine in 30 parts by volume of toluene and 20 parts by volume of chloroform is cooled to minus 5° C. and 2.41 parts by weight of isovaleryl chloride added. The solution is retained at this temperature for about one hour to allow for the formation of the mixed anhydride. There is then added 3.84 parts by weight of ethyl DL-phenylalanate and the mixture allowed to stand overnight at a temperature of about 8° C. The reaction mixture is then washed with water and the crystalline ethyl carbobenzoxy-DL-alanyl-DL-phenylalanate removed by filtration and washed with 3% sodium bicarbonate. The organic layer of the filtrate is separated, washed with 3% sodium bicarbonate solution and diluted with petroleum ether to crystallize a second crop of ethyl carbobenzoxy-DL-alanyl-DL-phenylalanate. The two crops of crystals are combined and purified by recrystallization from alcohol-water.

*Example X*

Example IX is repeated except that 4.10 parts by weight of phthalylglycine is substituted for the carbobenzoxy-DL-alanine of that example. The resulting colorless crystals of ethyl phthalylglycyl-DL-phenylalanate are purified by recrystallization from alcohol.

*Example XI*

Example VII is repeated except that 7.13 parts by weight of carbobenzoxyglycyl-DL-phenylalanine are substituted for the dicarbobenzoxy-L-lycine of that example. The colorless crystals of ethyl carbobenzoxyglycyl-DL-phenylalanylglycinate are purified by recrystallization from alcohol-water.

*Example XII*

A solution of the mixed anhydride of carbobenzoxyglycine and isovaleric acid is prepared as in Example III. To the solution of the anhydride in toluene is added dropwise and with stirring and cooling a second solution of 3.3 parts of DL-phenylalanine in 45 parts by volume of 1 normal sodium hydroxide. The heterogeneous reaction mixture is then stirred rapidly for about three hours and the aqueous layer is separated and acidified with hydrochloric acid to precipitate both the desired product and the isovaleric acid byproduct as an oily mixture. Addition of ethyl ether to this causes solution of the isovaleric acid and rapid separation of carbobenzoxyglycyl-DL-phenylalanine as colorless crystals.

Other substituted amides are prepared by procedures substantially identical with the above. In fact by such procedures many compounds in addition to the above have been prepared including carbobenzoxy-L-leucyl-L-tyrosine ethyl ester, phthalyl-DL-phenyl-alanylglycylglycine ethyl ester, phthalyl-DL-alanyl-DL-valine ethyl ester, carbobenzoxy-DL-alanyl-DL-valine ethyl ester, carbobenzoxy-glycyl-L-phenylalanine ethyl ester, phthalylglycyl-L-tyrosine ethyl ester, phthalyl-DL-leucyl-DL-phenylalanine ethyl ester, and phthalyl-DL-leucylglycylglycine ethyl ester.

I claim:

1. In a method of preparing amides wherein a compound having an amino group capable of being acylated is reacted with a mixed anhydride of an N-acylated aminoacid, the improvement which comprises employing a mixed anhydride of an acid selected from the group consisting of alpha branched chain saturated fatty acids having from 4 to 7 carbon atoms inclusive and beta branched chain saturated fatty acids having from 4 to 7 carbon atoms inclusive.

2. In a method of preparing amides wherein a compound having an amino group capable of being acylated is reacted with a mixed anhydride of an N-acylated amino acid, the improvement which comprises employing a mixed anhydride of said N-acylated amino acid with a beta branched chain saturated fatty acid having from 4 to 7 carbon atoms inclusive.

3. The improved method of claim 2 wherein said mixed anhydride is a mixed anhydride with isovaleric acid.

4. In a method of preparing amides wherein a compound having an amino group capable of being acylated is reacted with a mixed anhydride of an N-acylated amino acid, the improvement which comprises employing a mixed anhydride of said N-acylated amino acid with an alpha branched chain saturated fatty acid having from 4 to 7 carbon atoms inclusive.

5. The improved method of claim 4 wherein said mixed anhydride is a mixed anhydride with isobutyric acid.

6. The improved method of claim 4 wherein said mixed anhydride is a mixed anhydride with pivalic acid.

7. The improved method of claim 4 wherein said mixed anhydride is a mixed anhydride with 2-ethylbutyric acid.

8. The improved method of claim 4 wherein said mixed anhydride is a mixed anhydride with 2-methyl butyric acid.

9. In a method of preparing amides wherein an aminoacid ester is reacted with a mixed anhydride of an N-acylated aminoacid, the improvement which comprises employing anhydrous conditions and a mixed anhydride of said N-acylated aminoacid with a beta branched chain saturated fatty acid having from 4 to 7 carbon atoms inclusive.

10. The improved method of claim 9 wherein said mixed anhydride is a mixed anhydride with isovaleric acid.

11. A method of preparing amides, which method comprises reacting together, under anhydrous conditions, a lower alkyl ester of an aminoacid and a mixed anhydride of an N-acylated peptide acid with a beta branched chain saturated fatty acid having from 4 to 7 carbon atoms inclusive.

12. The method of claim 11 wherein said mixed anhydride is an anhydride of the N-acylated peptide acid with isovaleric acid.

13. The method which comprises reacting together under substantially anhydrous conditions a lower alkyl ester of a peptide acid having an amino group capable of being acylated and a mixed anhydride of an N-acylated aminoacid with a beta branched chain saturated fatty acid having from 4 to 7 carbon atoms inclusive.

14. The method of claim 13 wherein said mixed anhydride is a mixed anhydride of the N-acylated aminoacid with isovaleric acid.

References Cited in the file of this patent

Woodward et al.: J. Am. Chem. Soc., pp. 1551–52, vol. 69, June 1947.

Bailey: Nature, vol. 164, p. 889, November 19, 1949.

King et al.: J. Chem. Soc. (London), pp. 3315–19, December 1949.

Karrer: Organic Chemistry, 3rd Eng. ed., 1947, p. 213, Elsevier Publishing Co., Inc., N. Y.

Anson et al.: "Advances in Protein Chemistry," vol. 5, p. 25 (1949).